(12) United States Patent
Okada et al.

(10) Patent No.: US 10,156,696 B2
(45) Date of Patent: Dec. 18, 2018

(54) IMAGING LENS AND IMAGING APPARATUS

(71) Applicant: FUJIFILM Corporation, Tokyo (JP)

(72) Inventors: Kazuyoshi Okada, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/696,219

(22) Filed: Sep. 6, 2017

(65) Prior Publication Data

US 2018/0088302 A1 Mar. 29, 2018

(30) Foreign Application Priority Data

Sep. 29, 2016 (JP) .................................. 2016-191323

(51) Int. Cl.
*G02B 9/64* (2006.01)
*G02B 7/04* (2006.01)
*G02B 13/00* (2006.01)
*H04N 5/232* (2006.01)

(52) U.S. Cl.
CPC .................. *G02B 9/64* (2013.01); *G02B 7/04* (2013.01); *G02B 13/0045* (2013.01); *H04N 5/23212* (2013.01)

(58) Field of Classification Search
CPC ........ G02B 9/64; G02B 13/0045; G02B 7/04; H04N 5/23212

USPC .................................................. 359/642, 738
See application file for complete search history.

(56) References Cited

U.S. PATENT DOCUMENTS 7,173,777 B1 * 2/2007 Lu .......................... G02B 13/06
359/642

FOREIGN PATENT DOCUMENTS

| JP | H01-113714 A | 5/1989 |
| JP | H06-250080 A | 9/1994 |
| JP | 2000-039553 A | 2/2000 |
| JP | 2013-182054 A | 9/2013 |

* cited by examiner

*Primary Examiner* — Tuyen Tra

(74) *Attorney, Agent, or Firm* — Studebaker & Brackett PC

(57) ABSTRACT

The imaging lens consists of a first lens group G1, an aperture stop St, and a positive second lens group G2, in order from an object side. The first lens group G1 consists of a 1-1st negative meniscus lens L11 with its convex surface toward the object side, a 1-2nd negative lens L12 with its concave surface toward an image side, a 1-3rd positive lens L13 having a biconvex shape, a 1-4th negative meniscus lens L14 with its convex surface toward the object side, and a 1-5th positive lens L15 with its convex surface toward the object side, in order from the object side. Predetermined conditional expressions are satisfied which relate to a focal length of the whole system, a focal length of the first lens group G1, and a distance on an optical axis between the 1-4th negative meniscus lens L14 and the 1-5th positive lens L15.

20 Claims, 9 Drawing Sheets

EXAMPLE 2

EXAMPLE 1

EXAMPLE 2

EXAMPLE 3

EXAMPLE 4

EXAMPLE 5

EXAMPLE 2

IMAGING LENS AND IMAGING APPARATUS

CROSS REFERENCE TO RELATED APPLICATIONS

The present application claims priority under 35 U.S.C. § 119 to Japanese Patent Application No. 2016-191323 filed on Sep. 29, 2016. The above application is hereby expressly incorporated by reference, in its entirety, into the present application.

BACKGROUND OF THE INVENTION

1. Field of the Invention

The present invention relates to an imaging lens and an imaging apparatus, and particularly relates to a single-focus imaging lens suitable for a factory automation (FA) camera, a machine vision (MV) camera, a digital camera, a surveillance camera, an in-vehicle camera, and/or the like, and an imaging apparatus including this imaging lens.

2. Description of the Related Art

As a single-focus imaging lens capable of being used in a factory automation (FA) camera, a machine vision (MV) camera, a digital camera, a surveillance camera, an in-vehicle camera, and/or the like, for example, lens systems disclosed in JP1994-250080A (JP-H06-250080A), JP2000-39553A, JP1989-113714A (JP-H01-113714A), and JP2013-182054A are known.

SUMMARY OF THE INVENTION

In recent years, since there has been progress in an increase in the number of pixels of an imaging device, imaging lenses combined with the imaging device are also required to have a small F-Number and satisfactory spherical aberration in accordance therewith. In addition, in a case of use for FA or MV, it is also required that distortion is small while having a wide angle.

However, the lens system of JP1994-250080A (JP-H06-250080A) has a problem in that the angle of view is not sufficiently wide or an F-Number is not sufficiently small. In addition, the lens systems of JP2000-39553A and JP1989-113714A (JP-H01-113714A) have a problem in that distortion is not sufficiently small. In addition, the lens system of JP2013-182054A has a problem in that an F-Number is not sufficiently small.

The present invention has been contrived in view of such circumstances, and an object thereof is to provide an imaging lens having a small distortion with a wide angle and a small F-Number, and an imaging apparatus including this imaging lens.

According to the present invention, there is provided an imaging lens comprising, in order from an object side; a first lens group; a stop; and a second lens group having a positive refractive power, wherein the first lens group consists of a 1-1st negative meniscus lens with its convex surface toward the object side, a 1-2nd negative lens with its concave surface toward an image side, a 1-3rd positive lens having a biconvex shape, a 1-4th negative meniscus lens with its convex surface toward the object side, and a 1-5th positive lens with its convex surface toward the object side, in order from the object side, and the following Conditional Expressions (1) and (2) are satisfied, $$-0.2 < f/f1 < 0.1 \tag{1}$$

$$0.1 < D8/f < 2.5 \tag{2}$$

where f is a focal length of the whole system in a state of being focused on an infinite object, f1 is a focal length of the first lens group in a state of being focused on the infinite object, and D8 is a distance on an optical axis between the 1-4th negative meniscus lens and the 1-5th positive lens.

Meanwhile, it is preferable to satisfy the following Conditional Expression (1-1) and/or (2-1).

$$-0.15 < f/f1 < 0.05 \tag{1-1}$$

$$0.2 < D8/f < 2 \tag{2-1}$$

In the imaging lens of the present invention, it is preferable to satisfy the following Conditional Expression (3), and more preferable to satisfy the following Conditional Expression (3-1), $$-1 < (L4r-L5f)/(L4r+L5f) < -0.02 \tag{3}$$

$$-0.8 < (L4r-L5f)/(L4r+L5f) < -0.04 \tag{3-1}$$

where L4r is a paraxial curvature radius of a surface of the 1-4th negative meniscus lens on the image side, and L5f is a paraxial curvature radius of a surface of the 1-5th positive lens on the object side.

In addition, it is preferable to satisfy the following Conditional Expression (4), and more preferable to satisfy the following Conditional Expression (4-1), $$0.1 < (L4f-L4r)/(L4f+L4r) < 0.95 \tag{4}$$

$$0.15 < (L4f-L4r)/(L4f+L4r) < 0.93 \tag{4-1}$$

where L4f is a paraxial curvature radius of a surface of the 1-4th negative meniscus lens on the object side, and L4r is a paraxial curvature radius of a surface of the 1-4th negative meniscus lens on the image side.

In addition, it is preferable that during focusing from an infinite object to a short-distance object, the first lens group is fixed to an image plane, and a portion of or the entirety of the second lens group moves to the object side. In this case, it is preferable that during focusing, a lens of the second lens group closest to the object side moves at least.

In addition, it is preferable to satisfy the following Conditional Expression (5), and more preferable to satisfy the following Conditional Expression (5-1), $$0.02 < D8/L < 0.35 \tag{5}$$

$$0.03 < D8/L < 0.3 \tag{5-1}$$

where D8 is a distance on an optical axis between the 1-4th negative meniscus lens and the 1-5th positive lens, and L is a length on an optical axis from a surface of the first lens group closest to the object side to a surface of the first lens group closest to the image side.

In addition, it is preferable to satisfy the following Conditional Expression (6), and more preferable to satisfy the following Conditional Expression (6-1), $$3.5 < L/f < 8 \tag{6}$$

$$4.5 < L/f < 7 \tag{6-1}$$

where L is a length on an optical axis from a surface of the first lens group closest to the object side to a surface of the first lens group closest to the image side, and f is a focal length of the whole system in a state of being focused on the infinite object.

In addition, it is preferable to satisfy the following Conditional Expression (7), and more preferable to satisfy the following Conditional Expression (7-1), $$0.2 < f/f2 < 0.5 \quad (7)$$

$$0.25 < f/f2 < 0.45 \quad (7\text{-}1)$$

where f is a focal length of the whole system in a state of being focused on the infinite object, and f2 is a focal length of the second lens group in a state of being focused on the infinite object.

In addition, it is preferable to satisfy the following Conditional Expression (8), and more preferable to satisfy the following Conditional Expression (8-1), $$0.2 < h1/h2 < 0.8 \quad (8)$$

$$0.25 < h1/h2 < 0.6 \quad (8\text{-}1)$$

where h1 is a height of a paraxial on-axis light ray on a surface of the first lens group closest to the object side, and h2 is a height of a paraxial on-axis light ray of a surface of the first lens group closest to the image side.

In addition, it is preferable to satisfy the following Conditional Expression (9), and more preferable to satisfy the following Conditional Expression (9-1), $$0 \leq (\max-\min)/ave < 0.6 \quad (9)$$

$$0.05 < (\max-\min)/ave < 0.55 \quad (9\text{-}1)$$

where max is a maximum value of curvature radii of a surface of a negative lens of the first lens group on the image side, min is a minimum value of curvature radii of a surface of a negative lens of the first lens group on the image side, and ave is an average value of curvature radii of a surface of a negative lens of the first lens group on the image side.

In addition, it is preferable to satisfy the following Conditional Expression (10), $$0.9 < fL1/fL2 < 2 \quad (10)$$

where fL1 is a focal length of the 1-1st negative meniscus lens, and fL2 is a focal length of the 1-2nd negative lens.

According to the present invention, there is provided an imaging apparatus comprising the imaging lens of the present invention.

Meanwhile, the term "consist of ~" is intended to be allowed to include a lens having substantially no power, optical elements, other than a lens, such as a mirror, a stop, a mask, cover glass, or a filter having no power, and the like, in addition to the things enumerated as components.

In addition, the term "lens group" is not necessarily constituted by a plurality of lenses, but may be constituted by only one lens. In addition, the sign of the refractive power of the lens group, the sign of the refractive power of the lens, the surface shape of the lens, and the curvature radius of the surface of the lens are assumed to be those in a paraxial region in a case where an aspherical surface is included. In addition, the sign of the curvature radius is set to be positive in a case where a surface shape is convex on the object side, and is set to be negative in a case where a surface shape is convex on the image side.

According to the present invention, an imaging lens includes a first lens group, a stop, and a second lens group having a positive refractive power, in order from an object side, the first lens group consists of a 1-1st negative meniscus lens with its convex surface toward the object side, a 1-2nd negative lens with its concave surface toward an image side, a 1-3rd positive lens having a biconvex shape, a 1-4th negative meniscus lens with its convex surface toward the object side, and a 1-5th positive lens with its convex surface toward the object side, in order from the object side, and the following Conditional Expressions (1) and (2) are satisfied. Therefore, it is possible to provide an imaging lens having a small distortion with a wide angle and a small F-Number, and an imaging apparatus including this imaging lens.

$$-0.2 < f/f1 < 0.1 \quad (1)$$

$$0.1 < D8/f < 2.5 \quad (2)$$

DESCRIPTION OF THE PREFERRED EMBODIMENTS

Figure 1:
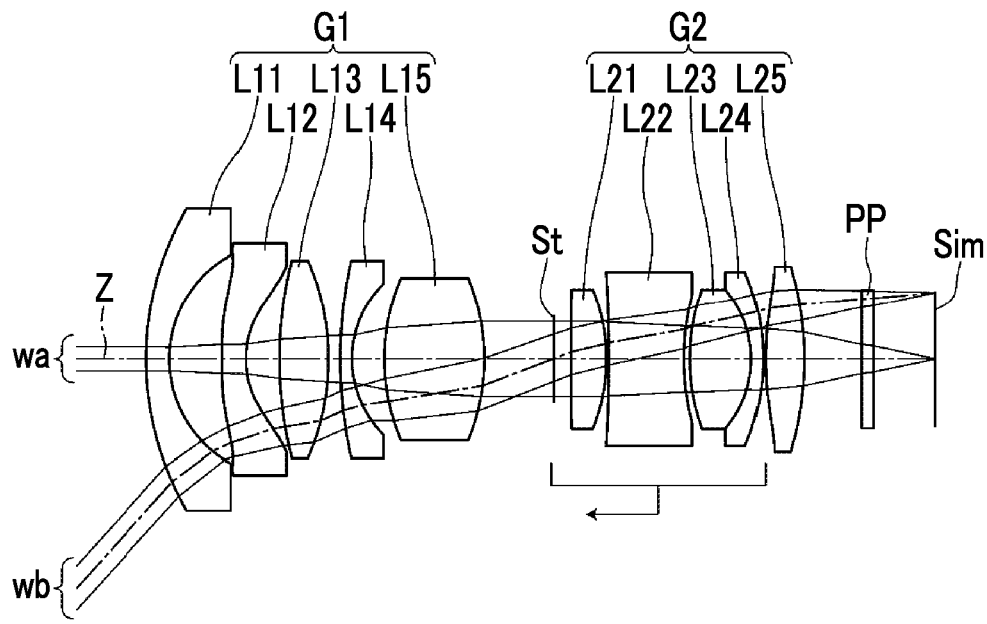
FIG. 1 is a cross-sectional view illustrating a configuration of an imaging lens (in common with that of Example 1) according to an embodiment of the present invention.

Hereinafter, an embodiment of the present invention will be described in detail with reference to the accompanying drawings. FIG. 1 is a cross-sectional view illustrating a lens configuration of an imaging lens according to an embodiment of the present invention. The configuration example shown in FIG. 1 is in common with a configuration of an imaging lens of Example 1 described later. FIG. 1 shows a state of being focused on an infinite object. In the drawing, the left side is an object side, the right side is an image side, and an aperture stop St shown in the drawing does not necessarily indicate its size and/or shape, but indicates the position of a stop on an optical axis Z. In addition, an on-axis light flux wa and a light flux wb of the maximum angle of view are also shown together.

The imaging lens of the present embodiment consists of a first lens group G1, the aperture stop St, and a second lens group G2 having a positive refractive power, in order from the object side.

In a case where this imaging lens is applied to an imaging apparatus, it is preferable that cover glass, a prism, and/or various types of filters such as an infrared cut filter or a low-pass filter are disposed between an optical system and an image plane Sim, in accordance with the configuration of a camera side having a lens mounted thereon, and thus FIG. 1 shows an example in which a parallel plate-like optical member PP oriented to these components is disposed between a lens system and the image plane Sim.

The first lens group G1 consists of a 1-1st negative meniscus lens L11 with its convex surface toward the object side, a 1-2nd negative lens L12 with its concave surface toward the image side, a 1-3rd positive lens L13 having a biconvex shape, a 1-4th negative meniscus lens L14 with its convex surface toward the object side, and a 1-5th positive lens L15 with its convex surface toward the object side, in order from the object side.

In this manner, two negative lenses of the 1-1st negative meniscus lens L11 and the 1-2nd negative lens L12 are disposed continuously to thereby disperse negative refractive power, and thus it is possible to suppress the generation of distortion while forming a wide angle. In addition, a lens closest to the object side is set to the 1-1st negative meniscus lens L11 with its convex surface toward the object side, and thus it is possible to suppress particularly the generation of distortion and astigmatism.

In addition, the 1-3rd positive lens L13 can correct distortion and lateral chromatic aberration which are generated in the 1-1st negative meniscus lens L11 and the 1-2nd negative lens L12 due to positive refractive power. Meanwhile, this 1-3rd positive lens L13 is formed in a biconvex shape, and thus it is possible to easily keep a balance between spherical aberration and astigmatism.

In addition, the 1-4th negative meniscus lens L14 can form a wide angle through negative refractive power while suppressing the generation of distortion and astigmatism due to its meniscus shape. In addition, since this 1-4th negative meniscus lens L14 is smaller in the height of a principal light ray than the 1-1st negative meniscus lens L11 and the 1-2nd negative lens L12, it is possible to easily keep a balance between on-axis chromatic aberration and lateral chromatic aberration.

In addition, the 1-5th positive lens L15 can correct distortion and lateral chromatic aberration which are generated in the 1-1st negative meniscus lens L11 and the 1-2nd negative lens L12 due to positive refractive power. Meanwhile, the surface of this 1-5th positive lens L15 on the object side is formed in a convex shape, and thus it is possible to easily keep a balance between spherical aberration and astigmatism. Further, this 1-5th positive lens L15 is formed in a biconvex shape, and thus it is possible to easily keep a balance between spherical aberration and distortion.

In addition, the imaging lens of the present embodiment is configured to satisfy the following Conditional Expressions (1) and (2).

$$-0.2 < f/f1 < 0.1 \tag{1}$$

$$0.1 < D8/f < 2.5 \tag{2}$$

Here, f is a focal length of the whole system in a state of being focused on an infinite object, f1 is a focal length of the first lens group in a state of being focused on the infinite object, and D8 is a distance on an optical axis between the 1-4th negative meniscus lens and the 1-5th positive lens.

The ratio value is not set to be equal to or less than the lower limit of Conditional Expression (1), and thus it is possible to suppress the generation of distortion in the first lens group G1. The ratio value is not set to be equal to or greater than the upper limit of Conditional Expression (1), and thus it is possible to secure a back focus.

The ratio value is not set to be equal to or less than the lower limit of Conditional Expression (2), and thus the action of an air lens formed between the 1-4th negative meniscus lens L14 and the 1-5th positive lens L15 has a tendency to be used in the correction of aberration. Thereby, it is possible to easily keep a balance between spherical aberration and the curvature of field, and distortion. The ratio value is not set to be equal to or greater than the upper limit of Conditional Expression (2), and thus the effective diameter of the 1-1st negative meniscus lens L11 and the entire length of the imaging lens can be kept small while suppressing distortion.

Meanwhile, in a case where the following Conditional Expression (1-1) and/or (2-1) is satisfied, it is possible to make characteristics more satisfactory.

$$-0.15 < f/f1 < 0.05 \tag{1-1}$$

$$0.2 < D8/f < 2 \tag{2-1}$$

In the imaging lens of the present invention, it is preferable to satisfy the following Conditional Expression (3). The ratio value is not set to be equal to or less than the lower limit of Conditional Expression (3), and thus it is possible to suppress the generation of distortion. The ratio value is not set to be equal to or less than the upper limit of Conditional Expression (3), and thus it is possible to suppress the generation of high-order spherical aberration and high-order distortion. Meanwhile, in a case where the following Conditional Expression (3-1) is satisfied, it is possible to make characteristics more satisfactory.

$$-1 < (L4r-L5f)/(L4r+L5f) < -0.02 \tag{3}$$

$$-0.8 < (L4r-L5f)/(L4r+L5f) < -0.04 \tag{3-1}$$

Here, L4r is a paraxial curvature radius of a surface of the 1-4th negative meniscus lens on the image side, and L5f is a paraxial curvature radius of a surface of the 1-5th positive lens on the object side.

In addition, it is preferable to satisfy the following Conditional Expression (4). The ratio value is not set to be equal to or less than the lower limit of Conditional Expression (4), and thus it is possible to suppress the generation of high-order spherical aberration. The ratio value is not set to be equal to or less than the upper limit of Conditional Expression (4), and thus it is possible to suppress the generation of distortion and astigmatism. Meanwhile, in a case where the following Conditional Expression (4-1) is satisfied, it is possible to make characteristics more satisfactory.

$$0.1 < (L4f-L4r)/(L4f+L4r) < 0.95 \tag{4}$$

$$0.15 < (L4f-L4r)/(L4f+L4r) < 0.93 \tag{4-1}$$

Here, L4f is a paraxial curvature radius of a surface of the 1-4th negative meniscus lens on the object side, and L4r is a paraxial curvature radius of a surface of the 1-4th negative meniscus lens on the image side.

In addition, during focusing from an infinite object to a short-distance object, it is preferable that the first lens group G1 is fixed to the image plane Sim, and that a portion of or the entirety of the second lens group G2 moves to the object side. With such an aspect, it is possible to suppress fluctuations in spherical aberration and the curvature of field during focusing while preventing the effective diameter of the 1-1st negative meniscus lens L11 from increasing. In this case, it is preferable that, during focusing, the lens of the second lens group G2 closest to the object side moves at least. In this manner, a lens close to the aperture stop St is moved to thereby suppress a fluctuation in the height of a principal light ray of the lens of the second lens group G2 closest to the object side during focusing, and thus it is possible to suppress a fluctuation in astigmatism.

In addition, it is preferable to satisfy the following Conditional Expression (5). The ratio value is not set to be equal to or less than the lower limit of Conditional Expression (5), and thus the action of an air lens has a tendency to be used in the correction of aberration. Thereby, it is possible to easily keep a balance between spherical aberration and the curvature of field, and distortion. The ratio value is not set to be equal to or less than the upper limit of Conditional Expression (5), and thus the effective diameter of the 1-1st negative meniscus lens L11 and the entire length of the imaging lens can be kept small. Meanwhile, in a case where the following Conditional Expression (5-1) is satisfied, it is possible to make characteristics more satisfactory.

$$0.02 < D8/L < 0.35 \tag{5}$$

$$0.03 < D8/L < 0.3 \tag{5-1}$$

Here, D8 is a distance on an optical axis between the 1-4th negative meniscus lens and the 1-5th positive lens, and L is a length on an optical axis from a surface of the first lens group closest to the object side to a surface of the first lens group closest to the image side.

In addition, it is preferable to satisfy the following Conditional Expression (6). The ratio value is not set to be equal to or less than the lower limit of Conditional Expression (6), and thus it is possible to achieve both an increase in angle and the securing of a back focus while suppressing the negative refractive power of the 1-1st negative meniscus lens L11 and the 1-2nd negative lens L12. The ratio value is not set to be equal to or less than the upper limit of Conditional Expression (6), and thus the effective diameter of the 1-1st negative meniscus lens L11 and the entire length of the imaging lens can be kept small. Meanwhile, in a case where the following Conditional Expression (6-1) is satisfied, it is possible to make characteristics more satisfactory.

$$3.5 < L/f < 8 \tag{6}$$

$$4.5 < L/f < 7 \tag{6-1}$$

Here, L is a length on an optical axis from a surface of the first lens group closest to the object side to a surface of the first lens group closest to the image side, and f is a focal length of the whole system in a state of being focused on the infinite object.

In addition, it is preferable to satisfy the following Conditional Expression (7). The ratio value is not set to be equal to or less than the lower limit of Conditional Expression (7), and thus the entire length of the imaging lens can be kept small. The ratio value is not set to be equal to or less than the upper limit of Conditional Expression (7), it is possible to suppress the generation of spherical aberration. Meanwhile, in a case where the following Conditional Expression (7-1) is satisfied, it is possible to make characteristics more satisfactory.

$$0.2 < f/f2 < 0.5 \tag{7}$$

$$0.25 < f/f2 < 0.45 \tag{7-1}$$

where f is a focal length of the whole system in a state of being focused on the infinite object, and f2 is a focal length of the second lens group in a state of being focused on the infinite object.

In addition, it is preferable to satisfy the following Conditional Expression (8). The ratio value is not set to be equal to or less than the lower limit of Conditional Expression (8), and thus it is possible to suppress the height of an on-axis marginal light ray incident on the second lens group G2, and to suppress the generation of spherical aberration. The ratio value is not set to be equal to or less than the upper limit of Conditional Expression (8), which leads to the advantage of an increase in angle. Meanwhile, in a case where the following Conditional Expression (8-1) is satisfied, it is possible to make characteristics more satisfactory.

$$0.2 < h1/h2 < 0.8 \tag{8}$$

$$0.25 < h1/h2 < 0.6 \tag{8-1}$$

Here, h1 is a height of a paraxial on-axis light ray on a surface of the first lens group closest to the object side, and h2 is a height of a paraxial on-axis light ray of a surface of the first lens group closest to the image side.

Meanwhile, h1 and h2 are based on a definition in paraxial light ray tracing according to Expressions (2.10) to (2.12), pp. 19 of "Optical Technology Series 1 Lens Design Method" (authored by Yoshiya Matsui, Kyoritsu Shuppan Co., Ltd.).

In addition, it is preferable to satisfy the following Conditional Expression (9). The ratio value is not set to be equal to or less than the lower limit of Conditional Expression (9), and thus it is possible to easily keep a balance between spherical aberration and distortion. The ratio value is not set to be equal to or less than the upper limit of Conditional Expression (9), and thus refractive power can be divided up on the surface of each negative lens of the first lens group G1 on the image side. Thereby, it is possible to suppress the generation of distortion and spherical aberration. Meanwhile, in a case where the following Conditional Expression (9-1) is satisfied, it is possible to make characteristics more satisfactory.

$$0 \leq (\text{max} - \text{min})/ave < 0.6 \tag{9}$$

$$0.05 < (\text{max} - \text{min})/ave < 0.55 \tag{9-1}$$

Here, max is a maximum value of curvature radii of a surface of a negative lens of the first lens group on the image side, min is a minimum value of curvature radii of a surface of a negative lens of the first lens group on the image side, and ave is an average value of curvature radii of a surface of a negative lens of the first lens group on the image side.

In addition, it is preferable to satisfy the following Conditional Expression (10). The ratio value is not set to be equal to or less than the lower limit of Conditional Expression (10), and thus it is possible to suppress the generation of distortion. The ratio value is not set to be equal to or greater than the upper limit of Conditional Expression (10), and thus the effective diameter of the 1-1st negative meniscus lens L11 and the entire length of the imaging lens can be kept small. In addition, it is possible to achieve an increase in angle while keeping the effective diameter of 1-1st negative meniscus lens L11 small.

$$0.9 < fL1/fL2 < 2 \tag{10}$$

Here, fL1 is a focal length of the 1-1st negative meniscus lens, and fL2 is a focal length of the 1-2nd negative lens.

In addition, it is preferable that the second lens group G2 consists of a 2-1st positive lens L21 with its convex surface toward the image side, a 2-2nd negative lens L22 with its concave surface toward the image side, a 2-3rd positive lens L23 with its convex surface toward the image side, a 2-4th negative lens L24 with its concave surface toward the object side, and a 2-5th positive lens L25 with its convex surface toward the object side, in order from the object side.

In a case where the second lens group G2 is formed to have the above configuration, the 2-1st positive lens L21 takes charge of the action of giving positive refractive power while suppressing the generation of astigmatism. The 2-2nd negative lens L22 takes charge of the action of correcting on-axis chromatic aberration and lateral chromatic aberration. The 2-3rd positive lens L23 takes charge of the action of giving positive refractive power while suppressing the generation of astigmatism. The 2-4th negative lens L24 takes charge of the action of correcting on-axis chromatic aberration and lateral chromatic aberration. In addition, since the height of a principal light ray can be made different by changing power distribution with the 2-2nd negative lens L22, it is possible to keep a balance between on-axis chromatic aberration and lateral chromatic aberration. The 2-5th positive lens L25 takes charge of the action of suppressing the angle of incidence of a light ray of a peripheral angle of view on the image plane Sim (generally, surface on which an imaging device is disposed) due to positive refractive power. Meanwhile, this 2-5th positive lens L25 is formed in a biconvex shape, and thus refractive power can be dispersed on the front and rear surfaces of the 2-5th positive lens L25, which leads to the advantage of suppressing the generation of spherical aberration.

In a case where the imaging lens is used in a strict environment, it is preferable that protective multilayer film coating is performed. Further, antireflection coating for reducing ghost light in use or the like may be performed with the exception of protective coating.

In addition, in a case where this imaging lens is applied to an imaging apparatus, cover glass, a prism, and/or various types of filters such as an infrared cut filter or a low-pass filter may be disposed between the lens system and the image plane Sim, in accordance with the configuration of a camera side having a lens mounted thereon. Meanwhile, instead of disposing various types of filters described above between the lens system and the image plane Sim, various types of filters described above may be disposed between respective lenses, and coating having the same actions as those of various types of filters may be performed on the lens surface of any of the lenses.

Next, numerical value examples of the imaging lens of the present invention will be described.

First, an imaging lens of Example 1 will be described. FIG. 1 shows a cross-sectional view illustrating a configuration of the imaging lens of Example 1. Meanwhile, in FIG. 1 and FIGS. 2 to 5 corresponding to Examples 2 to 5 described later, a state of being focused on an infinite object is shown, the left side is an object side, the right side is an image side, and the aperture stop St shown in the drawing does not necessarily indicate its size and/or shape, but indicates the position of a stop on the optical axis Z. In addition, an on-axis light flux wa and a light flux wb of the maximum angle of view are also shown together.

The imaging lens of Example 1 consists of a first lens group G1, an aperture stop St, and a second lens group G2 having a positive refractive power, in order from the object side. Likewise, the first lens group G1 consists of five lenses of lenses L11 to L15, and the second lens group G2 also consists of five lenses of lenses L21 to L25. In addition, during focusing from an infinite object to a short-distance object, the first lens group G1 is fixed to the image plane Sim, and four lenses of lenses L21 to L24 of the second lens group G2 is configured to move to the object side.

Table 1 shows lens data of the imaging lens of Example 1, Table 2 shows data relating to specifications, Table 3 shows data relating to surface spacings changing during focusing, and Table 4 shows data relating to aspherical coefficients. In the following, the meanings of symbols in the tables will be described by taking an example of those in Example 1, but the same is basically true of Examples 2 to 5.

In the lens data of Table 1, the column of a surface number indicates surface numbers sequentially increases toward the image side with the surface of a component closest to the object side set to a first surface, the column of a curvature radius indicates curvature radii of respective surfaces, and the column of a surface spacing indicates distances on the optical axis Z between the respective surfaces and the next surfaces. In addition, the column of n indicates refractive indexes of respective optical elements with respect to a d line (wavelength of 587.6 nm), and the column of ν indicates Abbe numbers of the respective optical elements with respect to the d line (wavelength of 587.6 nm). Here, the sign of the curvature radius is set to be positive in a case where s surface shape is convex on the object side, and is set to be negative in a case where a surface shape is convex on the image side. The lens data indicates the optical member PP together. In addition, in the lens data, DD [surface number] is written in the places of surface spacings having a change in spacing during focusing. Numerical values corresponding to DD [surface number] shown in Table 3.

The data relating to specifications of Table 2 indicates values a focal length f, an F-Number FNo, and the total angle of view 2ω.

In the lens data of Table 1, mark * is attached to the surface number of an aspherical surface, and the numerical values of a paraxial curvature radius are indicated as the curvature radius of the aspherical surface. The data relating to the aspherical coefficients of Table 4 indicates surface numbers of the aspherical surfaces and aspherical coefficients relating to these aspherical surfaces. "E±n" (n is an integer) in the numerical values of the aspherical coefficients of Table 4 means "×10$^{±n}$". The aspherical coefficients are values of respective coefficients KA and Am (m=3 to up to 20) in an aspherical expression represented by the following expression.

$$Zd = C \cdot h^2 / \{1 + (1 - KA \cdot C^2 \cdot h^2)^{1/2}\} + \Sigma Am \cdot h^m$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis), C is a reciprocal of the paraxial curvature radius, and KA and Am are aspherical coefficients (m=3 to up to 20).

TABLE 1

Example 1 Lens data (n and ν are based on the d line)

| Surface Number | Curvature Radius | Surface Spacing | n | ν |
|---|---|---|---|---|
| 1 | 25.86482 | 2.008 | 1.85001 | 43.00 |
| 2 | 10.29240 | 4.515 | | |
| *3 | 142.90293 | 2.000 | 1.61881 | 63.85 |

TABLE 1-continued

Example 1 Lens data (n and ν are based on the d line)

| Surface Number | Curvature Radius | Surface Spacing | n | ν |
|---|---|---|---|---|
| *4 | 8.66311 | 2.904 | | |
| 5 | 35.02666 | 4.221 | 1.56110 | 43.54 |
| 6 | −21.25122 | 1.006 | | |
| 7 | 39.09856 | 1.000 | 1.85000 | 43.00 |
| 8 | 9.16261 | 2.798 | | |
| 9 | 17.86446 | 8.599 | 1.64086 | 34.22 |
| 10 | −18.20077 | DD[10] | | |
| 11 (Stop) | ∞ | 1.500 | | |
| 12 | 389.87494 | 3.027 | 1.51999 | 64.23 |
| 13 | −16.18535 | 0.200 | | |
| 14 | −127.80455 | 6.463 | 1.81900 | 25.89 |
| 15 | 21.45568 | 0.509 | | |
| 16 | 17.45339 | 5.272 | 1.54023 | 63.45 |
| 17 | −9.22667 | 1.000 | 1.85000 | 22.50 |
| 18 | −19.04160 | DD[18] | | |
| *19 | 26.10366 | 3.330 | 1.58313 | 59.42 |
| *20 | −26.75806 | 5.000 | | |
| 21 | ∞ | 1.000 | 1.51633 | 64.14 |
| 22 | ∞ | 5.344 | | |

TABLE 2

Example 1 Specifications (d line)

| | Infinity | 0.1 m |
|---|---|---|
| f | 5.165 | 5.277 |
| FNo. | 2.45 | 2.52 |
| 2ω[°] | 95.8 | 94.4 |

TABLE 3

Example 1 Surface Spacing

| | Infinity | 0.1 m |
|---|---|---|
| DD[10] | 5.976 | 4.896 |
| DD[18] | 0.200 | 1.280 |

TABLE 4

Example 1 Aspherical Coefficient

| Surface Number | 3 | 4 | 19 | 20 |
|---|---|---|---|---|
| KA | 1.0000000E+00 | 1.0000000E+00 | 1.0000000E+00 | 1.0000000E+00 |
| A3 | −2.7755576E−18 | 3.0493186E−18 | −8.6736174E−20 | −1.7347235E−19 |
| A4 | 1.4610664E−03 | 1.7005770E−03 | −2.8963501E−05 | 1.0690511E−05 |
| A5 | −2.7723929E−04 | −8.4748836E−04 | −4.3558855E−05 | 2.3982877E−05 |
| A6 | −1.3657170E−05 | 3.3089179E−04 | 8.1274456E−06 | −1.1463123E−05 |
| A7 | 2.7930283E−05 | −5.6010079E−05 | 2.3559830E−06 | 1.3557914E−06 |
| A8 | −7.8794883E−06 | −1.2126538E−05 | −1.0709141E−06 | 3.1515873E−07 |
| A9 | 7.1517130E−08 | 5.5159877E−06 | 2.5194293E−08 | −5.1437222E−08 |
| A10 | 3.2915481E−07 | −2.0579804E−07 | 4.2080429E−08 | −9.0035279E−09 |
| A11 | −3.8846595E−08 | −1.7552362E−07 | −3.9549062E−09 | 6.7431504E−10 |
| A12 | −5.0674570E−09 | 2.1498849E−08 | −8.8069260E−10 | 2.6707026E−10 |
| A13 | 1.1242084E−09 | 2.3614635E−09 | 1.0758949E−10 | 8.0183340E−13 |
| A14 | 1.6837453E−11 | −5.2896838E−10 | 1.1742108E−11 | −5.8471114E−12 |
| A15 | −1.4578646E−11 | −4.1662610E−12 | −1.3849913E−12 | −1.0837299E−13 |
| A16 | 3.9968890E−13 | 5.7256864E−12 | −1.0518411E−13 | 7.7153016E−14 |
| A17 | 9.2032503E−14 | −2.0062331E−13 | 8.8404388E−15 | 1.0119051E−15 |
| A18 | −4.6011408E−15 | −2.3198210E−14 | 5.7680959E−16 | −5.3806179E−16 |
| A19 | −2.2982974E−16 | 1.4072985E−15 | −2.2492003E−17 | −3.0270889E−18 |
| A20 | 1.4772293E−17 | −5.1006908E−18 | −1.4165565E−18 | 1.5165496E−18 |

Figure 6:
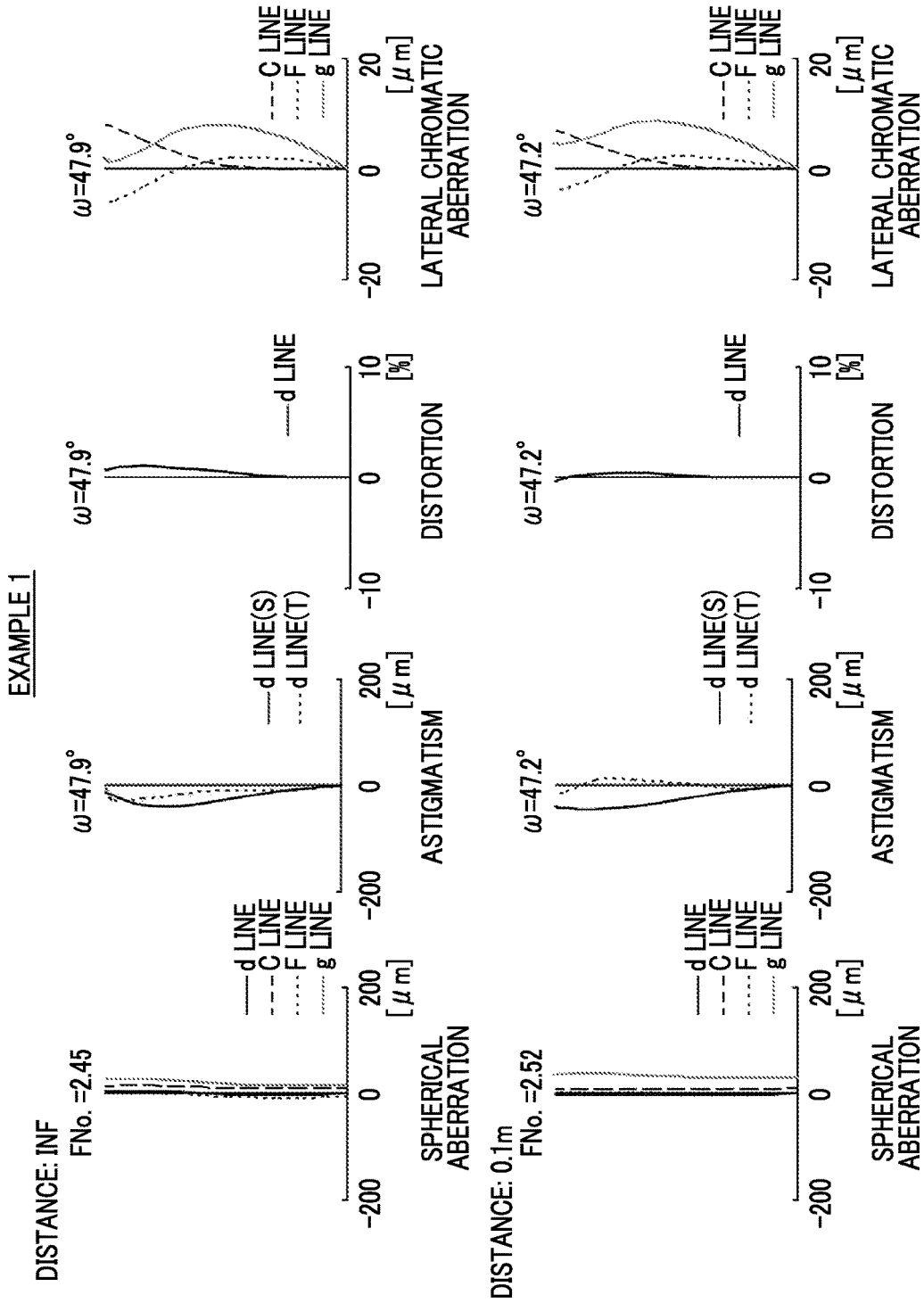
FIG. 6 is a diagram of aberrations of the imaging lens of Example 1 of the present invention.

FIG. 6 shows a diagram of aberrations of the imaging lens of Example 1. Meanwhile, spherical aberration, astigmatism, distortion, and lateral chromatic aberration in a state of being focused on an infinite object are shown in order from the upper left side of FIG. 6, and spherical aberration, astigmatism, distortion, and lateral chromatic aberration in a state of being focused on an object having a distance of 0.1 m are shown in order from the lower left side of FIG. 6. The diagram of aberrations indicating spherical aberration, astigmatism, and distortion aberration indicates aberrations in which the d line (wavelength of 587.6 nm) is used as a reference wavelength. In the spherical aberration diagram, aberrations relating to a d line (wavelength of 587.6 nm), a C line (wavelength 656.3 nm), an F line (wavelength of 486.1 nm), and a g line (wavelength of 435.8 nm) are indicated by a solid line, a long dashed line, a short dashed line, and a gray solid line, respectively. In the astigmatism diagram, aberrations in a sagittal direction and a tangential direction are indicated by a solid line and a short dashed line, respectively. In the lateral chromatic aberration diagram, aberrations relating to the C line (wavelength 656.3 nm), the F line (wavelength of 486.1 nm), and the g line (wavelength of 435.8 nm) are indicated by a long dashed line, a short dashed line, and a gray solid line, respectively. FNo. in the spherical aberration diagram means an F-Number, and ω in the other aberration diagrams means a half angle of view.

Symbols, meanings, and description methods of the respective pieces of data which have been set forth in the description of Example 1 are the same as those in the following examples unless otherwise noted, and thus the repeated description thereof will be omitted below.

Figure 2:
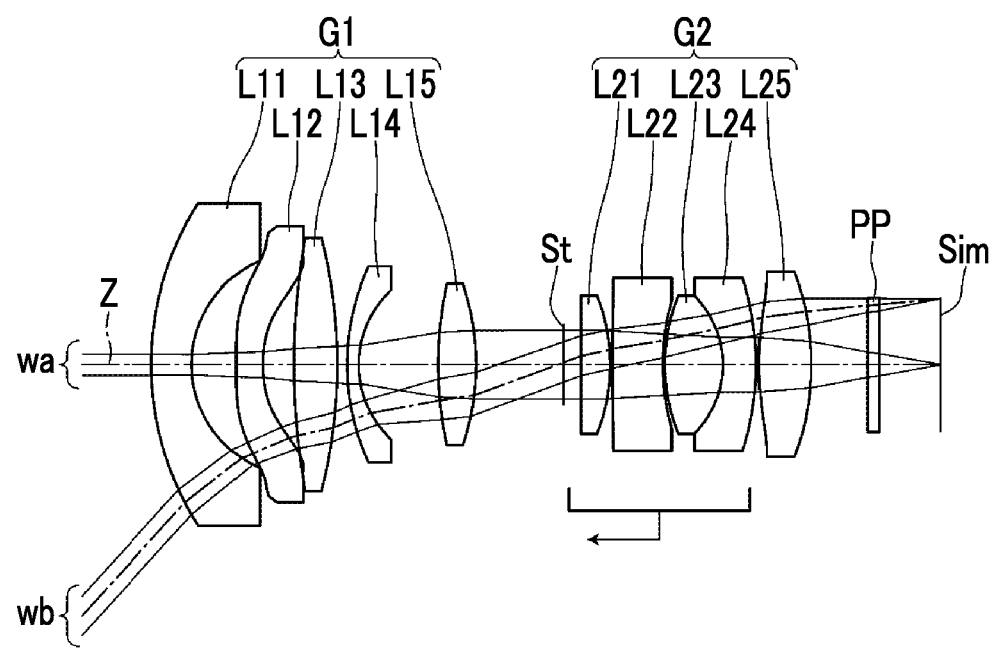
FIG. 2 is a cross-sectional view illustrating a configuration of an imaging lens of Example 2 of the present invention.
Figure 7:
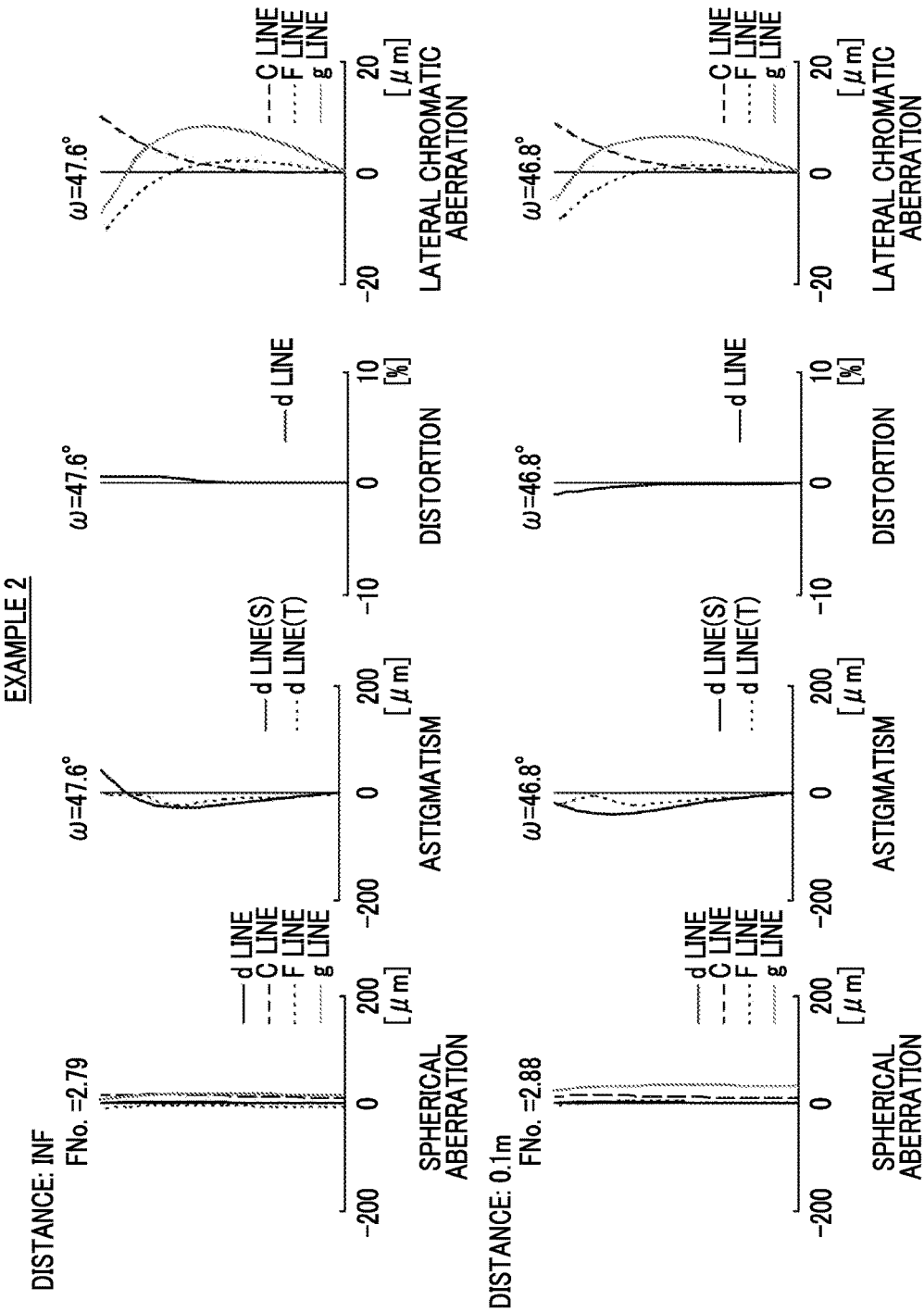
FIG. 7 is a diagram of aberrations of the imaging lens of Example 2 of the present invention.

Next, an imaging lens of Example 2 will be described. FIG. 2 shows a cross-sectional view illustrating a configuration of the imaging lens of Example 2. The imaging lens of Example 2 is configured to have lens groups and the number of lenses which are the same as those in Example 1, and the same is true of a lens moving during focusing. In addition, Table 5 shows lens data of the imaging lens of Example 2, Table 6 shows data relating to specifications, Table 7 shows data relating to surface spacings changing during focusing, Table 8 shows data relating to aspherical coefficients, and FIG. 7 shows a diagram of aberrations.

TABLE 5

Example 2 Lens data (n and ν are based on the d line)

| Surface Number | Curvature Radius | Surface Spacing | n | ν |
|---|---|---|---|---|
| 1 | 26.02839 | 3.507 | 1.85001 | 43.00 |
| 2 | 9.78646 | 3.847 | | |
| *3 | −300.80908 | 2.328 | 1.61881 | 63.85 |
| *4 | 13.71578 | 2.692 | | |
| 5 | 61.61008 | 3.760 | 1.51999 | 51.25 |
| 6 | −44.74492 | 0.873 | | |
| 7 | 20.47485 | 1.000 | 1.85001 | 43.00 |
| 8 | 8.90136 | 6.921 | | |
| 9 | 32.47988 | 3.302 | 1.72750 | 28.62 |
| 10 | −22.04767 | DD[10] | | |
| 11 (Stop) | ∞ | 1.498 | | |
| 12 | −12109.84222 | 2.542 | 1.58157 | 61.86 |
| 13 | −16.26277 | 0.200 | | |
| 14 | 374.10601 | 4.379 | 1.85001 | 25.39 |
| 15 | 19.83154 | 0.200 | | |
| 16 | 16.33005 | 5.030 | 1.53342 | 63.71 |
| 17 | −8.50304 | 2.887 | 1.85000 | 22.50 |
| 18 | −24.61940 | DD[18] | | |
| *19 | 25.71531 | 4.553 | 1.58313 | 59.42 |
| *20 | −24.40781 | 5.000 | | |
| 21 | ∞ | 1.000 | 1.51633 | 64.14 |
| 22 | ∞ | 5.344 | | |

TABLE 6

Example 2 Specifications (d line)

| | Infinity | 0.1 m |
|---|---|---|
| f | 5.219 | 5.354 |
| FNo. | 2.79 | 2.88 |
| 2ω[°] | 95.2 | 93.6 |

TABLE 7

Example 2 Surface Spacing

| | Infinity | 0.1 m |
|---|---|---|
| DD[10] | 7.649 | 6.351 |
| DD[18] | 0.200 | 1.498 |

TABLE 8

Example 2 Aspherical Coefficient

| Surface Number | 3 | 4 | 19 | 20 |
|---|---|---|---|---|
| KA | 1.0000000E+00 | 1.0000000E+00 | 1.0000000E+00 | 1.0000000E+00 |
| A3 | −7.7249405E−20 | −1.2109924E−19 | 2.6020852E−19 | 4.9873300E−19 |
| A4 | 9.7609689E−04 | 8.7218007E−04 | −9.0366952E−05 | 1.0471714E−05 |
| A5 | 1.6859674E−05 | 6.4875907E−05 | −1.8275671E−05 | −1.7309504E−05 |
| A6 | −2.1900657E−05 | −2.1759689E−05 | 6.8332594E−06 | 4.3375959E−08 |
| A7 | −4.8159070E−07 | −2.2755600E−06 | 7.2054807E−07 | 2.2923868E−06 |
| A8 | 4.1187640E−07 | 3.2054560E−07 | −8.4666672E−07 | −4.6174299E−07 |
| A9 | 1.4451245E−08 | 4.1003350E−08 | 7.2989016E−08 | −5.1157975E−08 |
| A10 | −6.8752759E−09 | −4.1202298E−09 | 3.2321192E−08 | 1.9900536E−08 |
| A11 | −2.9653851E−10 | −3.9921052E−10 | −4.6958756E−09 | 1.1904386E−10 |
| A12 | 9.4176188E−11 | 5.6030544E−11 | −6.5329759E−10 | −4.0916173E−10 |
| A13 | 3.8333992E−12 | −2.2351892E−12 | 1.1325232E−10 | 1.4598327E−11 |
| A14 | −9.5825786E−13 | −1.2804451E−12 | 8.5118555E−12 | 4.1323605E−12 |
| A15 | −3.1573376E−14 | 1.1024368E−13 | −1.3947932E−12 | −2.6516002E−13 |
| A16 | 6.5373155E−15 | 2.2457018E−14 | −7.6828556E−14 | −1.2032563E−14 |
| A17 | 1.5044117E−16 | −1.1077057E−15 | 8.7160323E−15 | 1.8936448E−15 |
| A18 | −2.6678862E−17 | −1.9650344E−16 | 4.3490773E−16 | −9.9050806E−17 |
| A19 | −3.1139831E−19 | 3.5972140E−18 | −2.1918723E−17 | −5.0113156E−18 |
| A20 | 4.9716794E−20 | 6.7406876E−19 | −1.1075058E−18 | 6.0479540E−19 |

Figure 3:
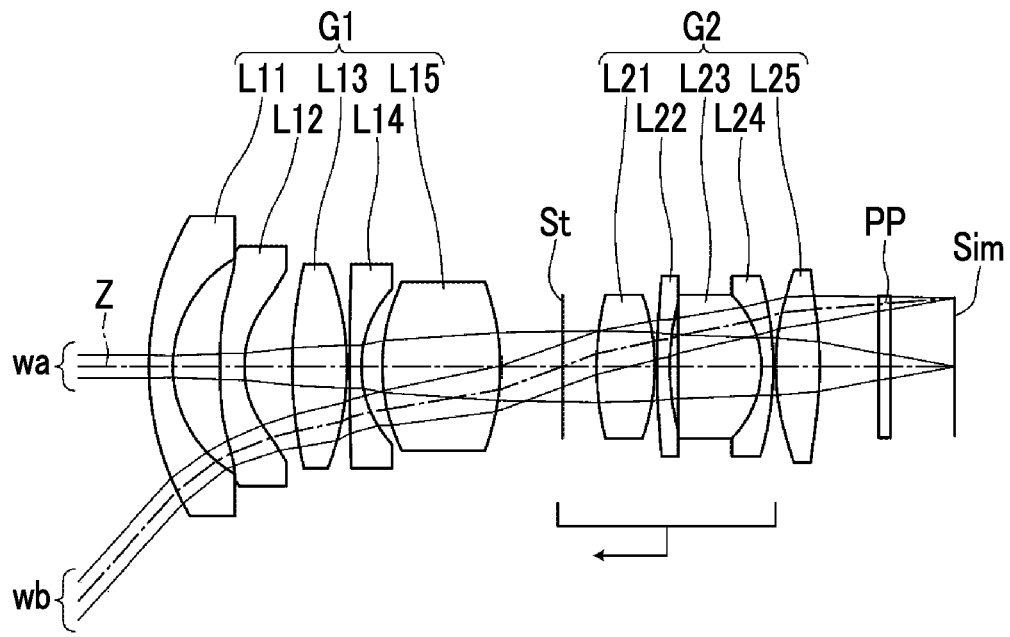
FIG. 3 is a cross-sectional view illustrating a configuration of an imaging lens of Example 3 of the present invention.
Figure 8:
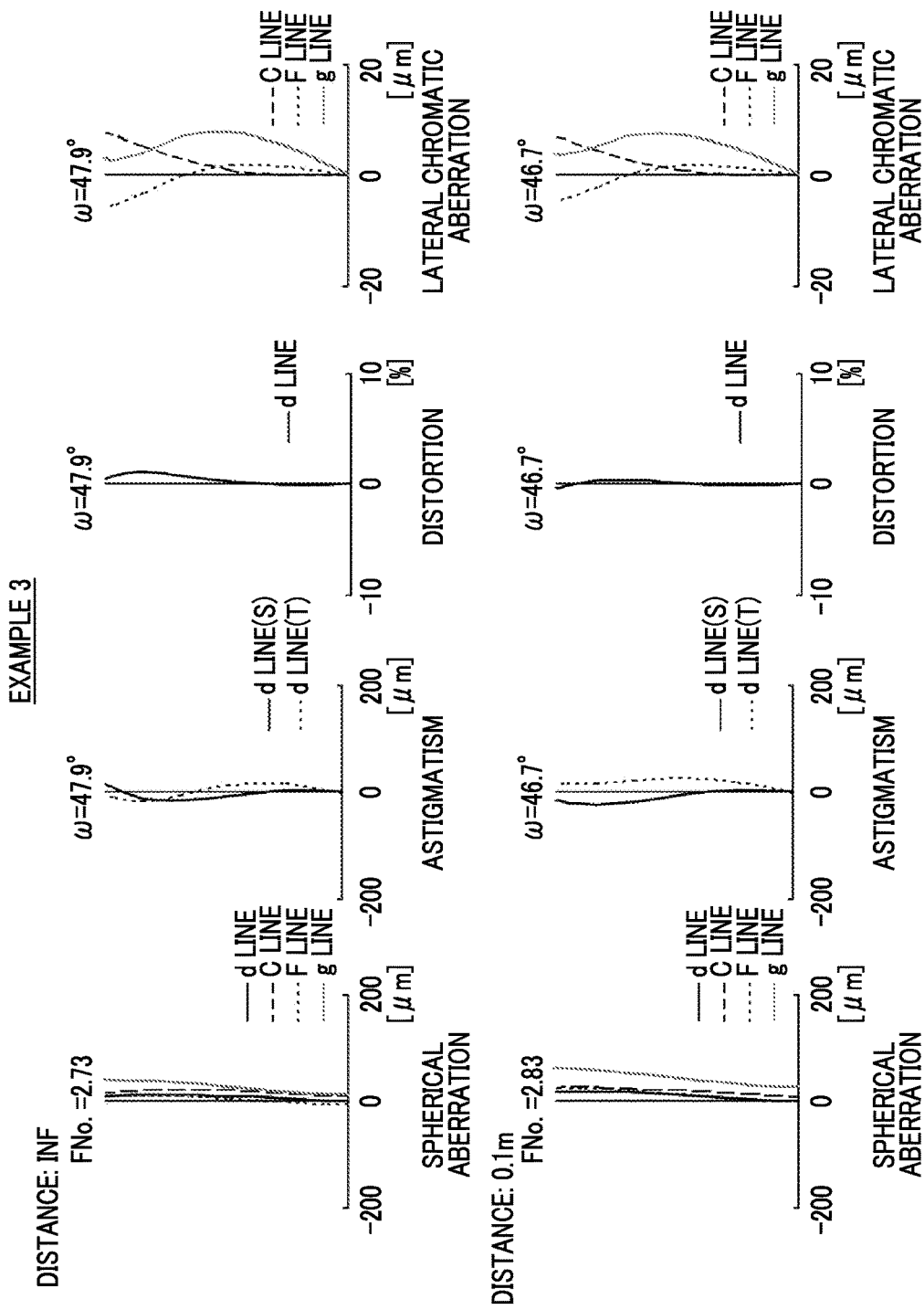
FIG. 8 is a diagram of aberrations of the imaging lens of Example 3 of the present invention.

Next, an imaging lens of Example 3 will be described. FIG. 3 shows a cross-sectional view illustrating a configuration of the imaging lens of Example 3. The imaging lens of Example 3 is configured to have lens groups and the number of lenses which are the same as those in Example 1, and the same is true of a lens moving during focusing. In addition, Table 9 shows lens data of the imaging lens of Example 3, Table 10 shows data relating to specifications, Table 11 shows data relating to surface spacings changing during focusing, Table 12 shows data relating to aspherical coefficients, and FIG. 8 shows a diagram of aberrations.

TABLE 9

Example 3 Lens data (n and ν are based on the d line)

| Surface Number | Curvature Radius | Surface Spacing | n | ν |
|---|---|---|---|---|
| 1 | 24.41735 | 2.000 | 1.85001 | 43.00 |
| 2 | 10.39543 | 3.980 | | |
| *3 | −439.58513 | 2.000 | 1.58313 | 59.42 |
| *4 | 10.30347 | 4.009 | | |
| 5 | 38.18045 | 4.561 | 1.60372 | 37.63 |
| 6 | −23.30187 | 0.200 | | |
| 7 | 205.51634 | 1.000 | 1.85001 | 43.00 |
| 8 | 9.47986 | 1.760 | | |
| 9 | 15.95767 | 9.852 | 1.63098 | 34.93 |
| 10 | −19.73383 | DD[10] | | |
| 11 (Stop) | ∞ | 2.868 | | |
| 12 | 24.99431 | 4.849 | 1.52659 | 63.98 |
| 13 | −18.03360 | 0.200 | | |
| 14 | 72.87679 | 1.067 | 1.76354 | 26.82 |
| 15 | 21.37518 | 0.720 | | |
| 16 | ∞ | 6.924 | 1.61800 | 63.33 |
| 17 | −8.48373 | 1.000 | 1.83382 | 24.78 |
| 18 | −26.31185 | DD[18] | | |
| *19 | 19.63797 | 3.673 | 1.58313 | 59.42 |
| *20 | −30.38320 | 5.000 | | |
| 21 | ∞ | 1.000 | 1.51633 | 64.14 |
| 22 | ∞ | 5.345 | | |

TABLE 10

Example 3 Specifications (d line)

|  | Infinity | 0.1 m |
|---|---|---|
| f | 5.167 | 5.386 |
| FNo. | 2.73 | 2.83 |
| 2ω[°] | 95.8 | 93.4 |

TABLE 11

Example 3 Surface Spacing

|  | Infinity | 0.1 m |
|---|---|---|
| DD[10] | 5.121 | 3.502 |
| DD[18] | 0.200 | 1.819 |

TABLE 12

Example 3 Aspherical Coefficient

| Surface Number | 3 | 4 | 19 | 20 |
|---|---|---|---|---|
| KA | 1.0000000E+00 | 1.0000000E+00 | 1.0000000E+00 | 1.0000000E+00 |
| A3 | 1.3877788E−18 | 2.0328791E−18 | −8.6736174E−20 | 8.6736174E−20 |
| A4 | 1.1882872E−03 | 1.6475665E−03 | −4.8446350E−05 | 1.1848940E−04 |
| A5 | −8.3667228E−06 | −6.7643221E−04 | 1.0364631E−05 | −3.7148447E−05 |
| A6 | −7.5629536E−05 | 2.9757977E−04 | −3.5156029E−06 | 8.5199118E−06 |
| A7 | 2.4416316E−05 | −5.9808478E−05 | 2.1969487E−06 | 1.4524847E−06 |
| A8 | −3.7160452E−06 | −8.6090391E−06 | −3.1438406E−07 | −9.0099059E−07 |
| A9 | −3.3766401E−07 | 5.2460884E−06 | −8.4119832E−08 | 5.0614530E−08 |
| A10 | 2.2096642E−07 | −3.5856636E−07 | 2.6812740E−08 | 3.1895025E−08 |
| A11 | −1.8133870E−08 | −1.5286610E−07 | 8.9627549E−10 | −3.7016922E−09 |
| A12 | −3.9433224E−09 | 2.4955160E−08 | −8.5506592E−10 | −6.1325499E−10 |
| A13 | 6.8385680E−10 | 1.6284966E−09 | 9.0383055E−12 | 8.7768311E−11 |
| A14 | 1.9989983E−11 | −5.6816616E−10 | 1.5307370E−11 | 7.0264252E−12 |
| A15 | −9.6486517E−12 | 8.2705161E−12 | −3.0839098E−13 | −1.0405205E−12 |
| A16 | 2.1828433E−13 | 5.8585388E−12 | −1.6065077E−13 | −4.8320400E−14 |
| A17 | 6.3559051E−14 | −3.0995470E−13 | 2.7239732E−15 | 6.2283199E−15 |
| A18 | −3.0616853E−15 | −2.1989919E−14 | 9.1211405E−16 | 1.8291453E−16 |
| A19 | −1.6287240E−16 | 1.8009466E−15 | −8.2875334E−18 | −1.5010825E−17 |
| A20 | 1.0411747E−17 | −1.3770112E−17 | −2.1467334E−18 | −2.8291027E−19 |

Figure 4:
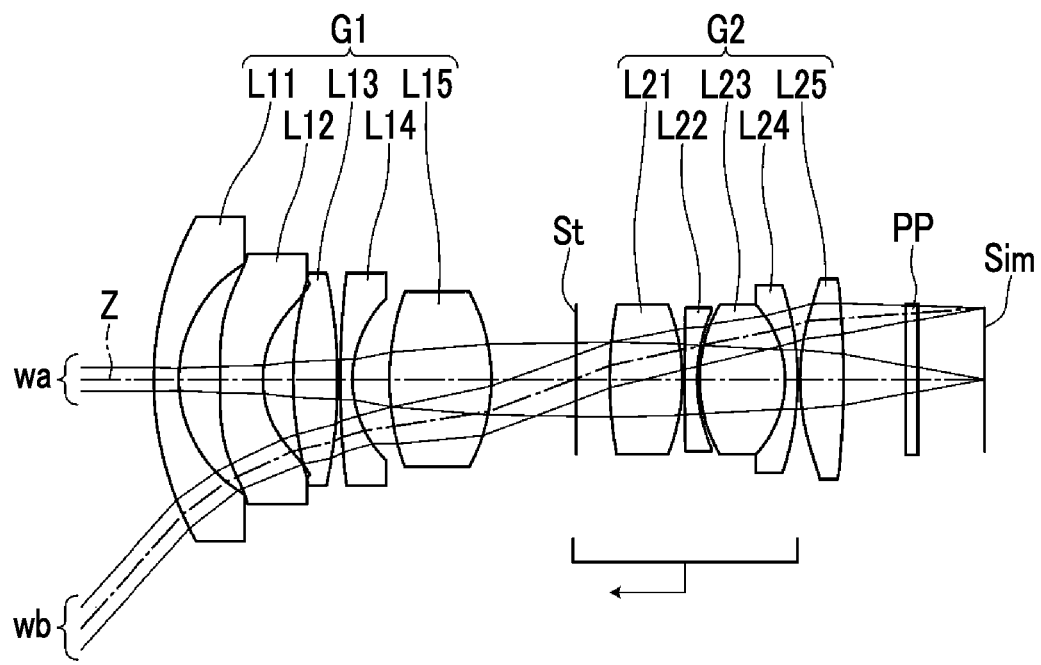
FIG. 4 is a cross-sectional view illustrating a configuration of an imaging lens of Example 4 of the present invention.
Figure 9:
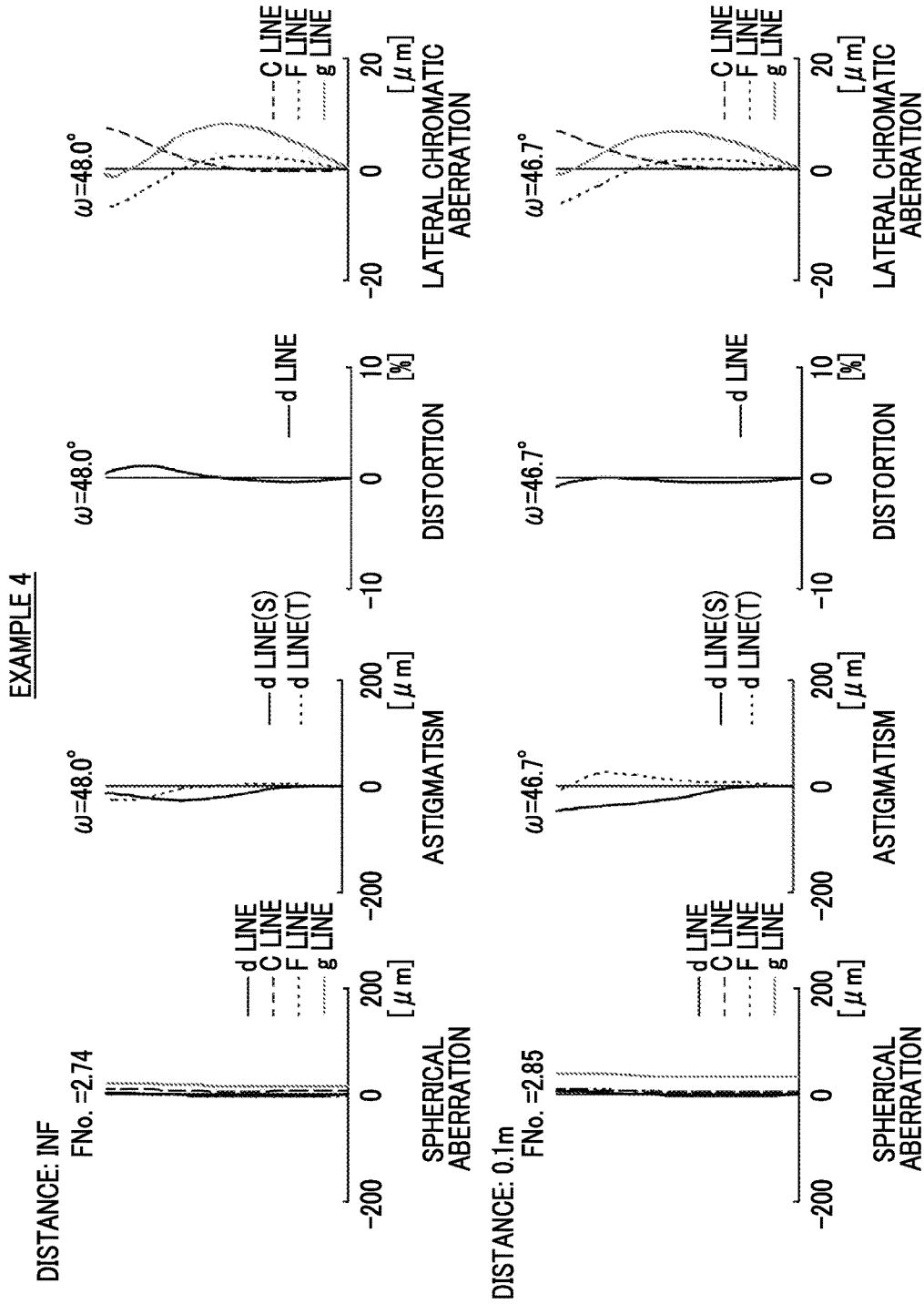
FIG. 9 is a diagram of aberrations of the imaging lens of Example 4 of the present invention.

Next, an imaging lens of Example 4 will be described. FIG. 4 shows a cross-sectional view illustrating a configuration of the imaging lens of Example 4. The imaging lens of Example 4 is configured to have lens groups and the number of lenses which are the same as those in Example 1, and the same is true of a lens moving during focusing. In addition, Table 13 shows lens data of the imaging lens of Example 4, Table 14 shows data relating to specifications, Table 15 shows data relating to surface spacings changing during focusing, Table 16 shows data relating to aspherical coefficients, and FIG. 9 shows a diagram of aberrations.

TABLE 13

Example 4 Lens data (n and ν are based on the d line)

| Surface Number | Curvature Radius | Surface Spacing | n | ν |
|---|---|---|---|---|
| 1 | 26.59061 | 2.000 | 1.85000 | 43.00 |
| 2 | 10.72261 | 3.320 | | |
| *3 | −583.05777 | 3.453 | 1.61881 | 63.85 |
| *4 | 10.18849 | 2.405 | | |
| 5 | 29.12987 | 3.576 | 1.65615 | 33.13 |
| 6 | −40.23407 | 0.200 | | |
| 7 | 72.73900 | 1.000 | 1.85000 | 43.00 |
| 8 | 9.21576 | 2.951 | | |
| 9 | 20.52504 | 8.184 | 1.57859 | 40.26 |
| 10 | −14.69801 | DD[10] | | |
| 11 (Stop) | ∞ | 2.693 | | |
| 12 | 32.28954 | 5.831 | 1.53527 | 48.39 |
| 13 | −16.33151 | 0.200 | | |
| 14 | 271.71087 | 0.984 | 1.84999 | 37.42 |
| 15 | 13.55938 | 0.200 | | |
| 16 | 11.88979 | 6.870 | 1.49700 | 81.61 |
| 17 | −8.84886 | 1.000 | 1.84999 | 24.60 |
| 18 | −23.61028 | DD[18] | | |
| *19 | 18.33481 | 3.522 | 1.67790 | 54.89 |
| *20 | −52.65836 | 5.000 | | |
| 21 | ∞ | 1.000 | 1.51633 | 64.14 |
| 22 | ∞ | 5.343 | | |

TABLE 14

Example 4 Specifications (d line)

|  | Infinity | 0.1 m |
|---|---|---|
| f | 5.151 | 5.376 |
| FNo. | 2.74 | 2.85 |
| 2ω[°] | 96.0 | 93.4 |

TABLE 15

Example 4 Surface Spacing

|  | Infinity | 0.1 m |
|---|---|---|
| DD[10] | 6.732 | 4.946 |
| DD[18] | 0.200 | 1.986 |

TABLE 16

Example 4 Aspherical Coefficient

| Surface Number | 3 | 4 | 19 | 20 |
|---|---|---|---|---|
| KA | 1.0000000E+00 | 1.0000000E+00 | 1.0000000E+00 | 1.0000000E+00 |
| A3 | −6.9388939E−19 | 4.0657581E−18 | −3.7947076E−19 | 2.6020852E−19 |
| A4 | 7.6871540E−04 | 1.1909668E−03 | −8.9895394E−05 | −9.3382608E−05 |
| A5 | 1.6840893E−04 | −1.2778413E−04 | 4.5252741E−05 | 9.3995131E−05 |
| A6 | −1.1664538E−04 | 4.9057285E−05 | −1.1773268E−05 | −1.1766785E−05 |
| A7 | 2.3237678E−05 | −5.6774599E−05 | −6.7437778E−07 | −5.7989389E−06 |
| A8 | −2.1482811E−08 | 2.2141979E−05 | 6.5234617E−07 | 1.3098721E−06 |
| A9 | −8.3903470E−07 | −4.6062874E−07 | 2.0046525E−08 | 2.2111807E−07 |
| A10 | 1.1412830E−07 | −1.6847078E−06 | −2.4690616E−08 | −6.0876563E−08 |
| A11 | 7.8173996E−09 | 2.8335744E−07 | −1.0048830E−09 | −5.1250399E−09 |
| A12 | −2.9410237E−09 | 4.2026405E−08 | 6.9573624E−10 | 1.5522888E−09 |
| A13 | 9.9891637E−11 | −1.3449225E−08 | 1.8008575E−11 | 7.5201837E−11 |
| A14 | 3.1089599E−11 | −1.3771446E−09 | −1.2346607E−11 | −2.3718204E−11 |
| A15 | −2.7875510E−12 | 2.8291896E−10 | −1.1371194E−13 | −6.9014152E−13 |
| A16 | −1.1367994E−13 | −1.1567150E−11 | 1.2830328E−13 | 2.1592181E−13 |
| A17 | 2.2401598E−14 | −2.8747802E−12 | −7.1039614E−17 | 3.6374408E−15 |
| A18 | −3.1756090E−16 | 1.9654220E−13 | −7.2248905E−16 | −1.0761763E−15 |
| A19 | −6.3204598E−17 | 1.1493007E−14 | 2.2373975E−18 | −8.4047408E−18 |
| A20 | 2.4717007E−18 | −9.8888803E−16 | 1.7146947E−18 | 2.2511307E−18 |

Figure 5:
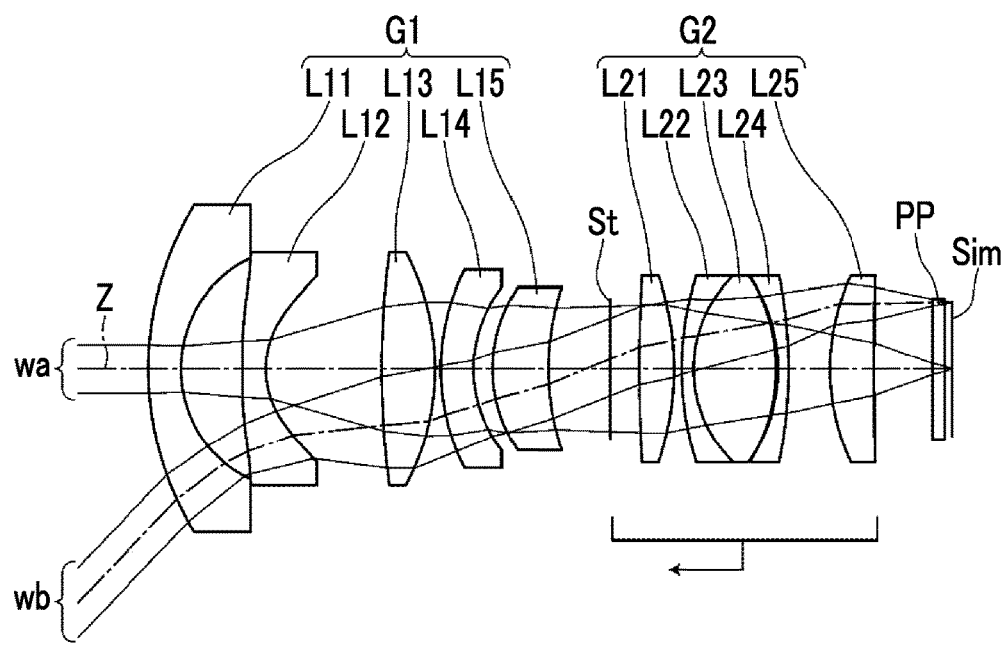
FIG. 5 is a cross-sectional view illustrating a configuration of an imaging lens of Example 5 of the present invention.
Figure 10:
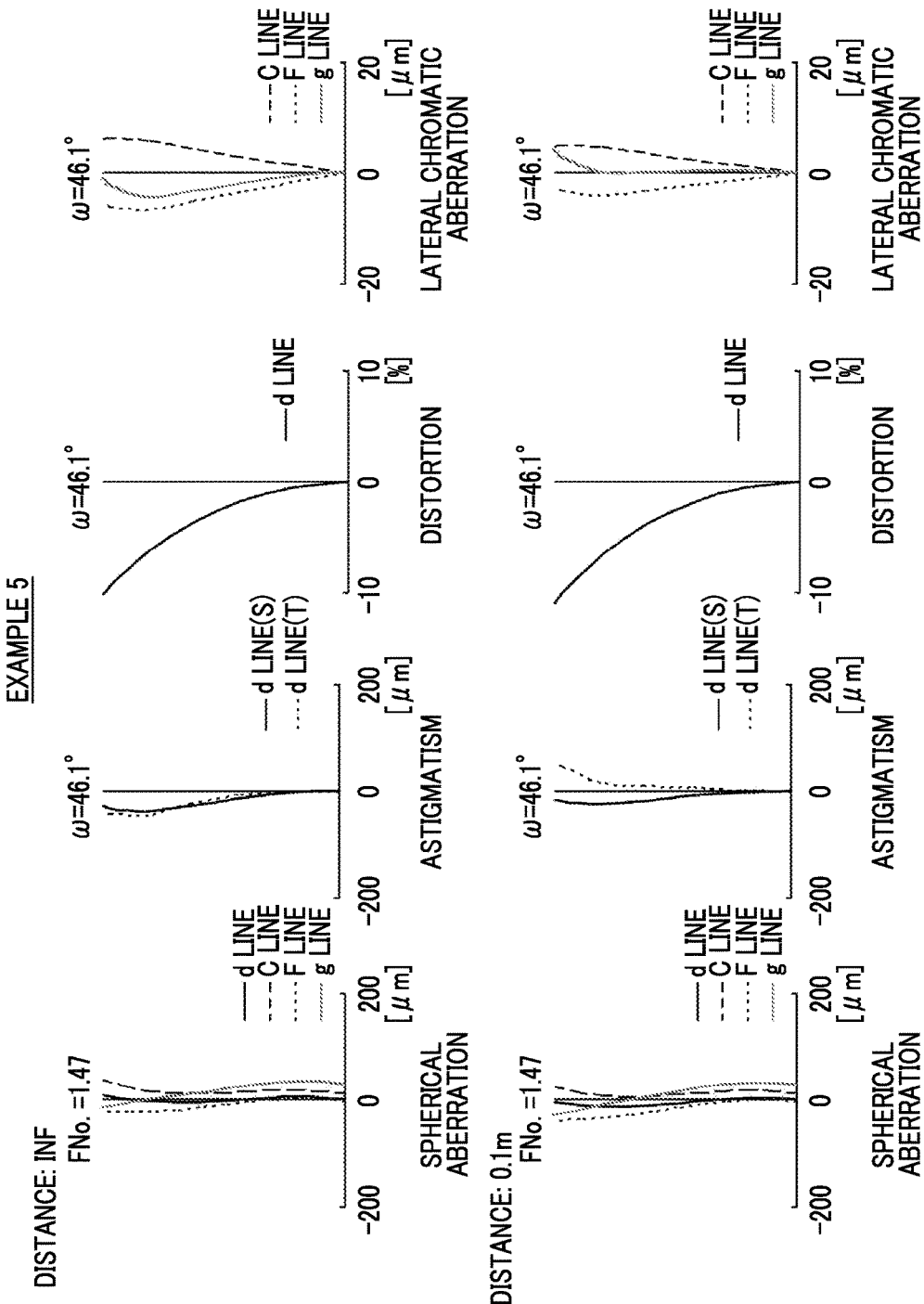
FIG. 10 is a diagram of aberrations of the imaging lens of Example 5 of the present invention.

Next, an imaging lens of Example 5 will be described. FIG. 5 shows a cross-sectional view illustrating a configuration of the imaging lens of Example 5. The imaging lens of Example 5 is configured to have lens groups and the number of lenses which are the same as those in Example 1, but during focusing from an infinite object to a short-distance object, the first lens group G1 is fixed to the image plane Sim, and the entire second lens group G2 (five lenses of lenses L21 to L25) is configured to move to the object side. In addition, Table 17 shows lens data of the imaging lens of Example 5, Table 18 shows data relating to specifications, Table 19 shows data relating to surface spacings changing during focusing, Table 20 shows data relating to aspherical coefficients, and FIG. 10 shows a diagram of aberrations.

TABLE 17

Example 5 Lens data (n and ν are based on the d line)

| Surface Number | Curvature Radius | Surface Spacing | n | ν |
|---|---|---|---|---|
| 1 | 26.99105 | 2.776 | 1.71700 | 55.65 |
| 2 | 10.48858 | 5.323 | | |
| *3 | −16640.40688 | 2.000 | 1.58313 | 59.42 |
| *4 | 8.51464 | 9.899 | | |
| 5 | 76.50454 | 4.562 | 1.85001 | 43.00 |
| 6 | −21.20513 | 0.484 | | |
| 7 | 18.82334 | 2.800 | 1.84999 | 32.72 |
| 8 | 11.16714 | 1.685 | | |
| 9 | 12.64380 | 4.696 | 1.51999 | 51.25 |
| 10 | 21.69527 | DD[10] | | |
| 11 (Stop) | ∞ | 2.493 | | |
| 12 | 131.39214 | 2.959 | 1.85001 | 43.00 |
| 13 | −24.91579 | 0.665 | | |
| 14 | 26.35139 | 1.000 | 1.85001 | 22.50 |
| 15 | 11.09715 | 7.077 | 1.56438 | 62.52 |
| 16 | −15.21968 | 0.200 | | |
| 17 | −13.74413 | 0.900 | 1.85001 | 22.50 |
| 18 | −40.40680 | 3.554 | | |
| 19 | 18.85318 | 3.825 | 1.85001 | 37.70 |
| 20 | 387.33998 | DD[20] | | |
| 21 | ∞ | 1.000 | 1.51633 | 64.14 |
| 22 | ∞ | 0.669 | | |

TABLE 18

Example 5 Specifications (d line)

| | Infinity | 0.1 m |
|---|---|---|
| f | 6.158 | 6.165 |
| FNo. | 1.47 | 1.47 |
| 2ω[°] | 92.2 | 92.2 |

TABLE 19

Example 5 Surface Spacing

| | Infinity | 0.1 m |
|---|---|---|
| DD[10] | 5.278 | 4.938 |
| DD[20] | 5.000 | 5.340 |

TABLE 20

Example 5 Aspherical Coefficient

| Surface Number | 3 | 4 |
|---|---|---|
| KA | 1.0000000E+00 | 1.0000000E+00 |
| A3 | −2.6826717E−04 | −1.5246593E−18 |
| A4 | 1.8523354E−03 | 1.5018533E−03 |
| A5 | −1.0660658E−03 | −8.3930733E−04 |
| A6 | 4.0265518E−04 | 2.4884196E−04 |
| A7 | −8.1210512E−05 | 1.2640843E−06 |
| A8 | 4.9364837E−06 | −1.9249018E−05 |
| A9 | 8.4067174E−07 | 2.5589491E−06 |
| A10 | −1.1255280E−07 | 6.1541397E−07 |
| A11 | −6.0354058E−09 | −1.4073858E−07 |
| A12 | 1.8517661E−09 | −9.0713915E−09 |
| A13 | −3.6081193E−10 | 3.7506731E−09 |
| A14 | 6.8809452E−11 | 8.6990718E−12 |
| A15 | −1.7122569E−12 | −5.6319117E−11 |
| A16 | −1.3796144E−12 | 1.7204671E−12 |
| A17 | 2.0273566E−13 | 4.5558839E−13 |
| A18 | −1.0786098E−14 | −2.3174760E−14 |
| A19 | 1.4092009E−16 | −1.5440675E−15 |
| A20 | 3.8047300E−18 | 9.9244794E−17 |

Table 21 shows values corresponding to Conditional Expressions (1) to (10) of the imaging lenses of Examples 1 to 5. Meanwhile, the d line is used as a reference wavelength in all the examples, and values shown in the following Table 21 are equivalent to those at this reference wavelength.

TABLE 21

| Expression Number | Conditional Expression | Example 1 | Example 2 | Example 3 | Example 4 | Example 5 |
|---|---|---|---|---|---|---|
| (1) | f/f1 | 0.017 | 0.004 | −0.092 | −0.075 | −0.051 |
| (2) | D8/f | 0.542 | 1.326 | 0.341 | 0.573 | 0.274 |
| (3) | (L4r − L5f)/(L4r + L5f) | −0.322 | −0.570 | −0.255 | −0.380 | −0.062 |
| (4) | (L4f − L4r)/(L4f + L4r) | 0.620 | 0.394 | 0.912 | 0.775 | 0.255 |
| (5) | D8/L | 0.096 | 0.245 | 0.060 | 0.109 | 0.049 |
| (6) | L/f | 5.624 | 5.409 | 5.683 | 5.259 | 5.558 |
| (7) | f/f2 | 0.332 | 0.319 | 0.336 | 0.332 | 0.417 |
| (8) | h1/h2 | 0.331 | 0.319 | 0.339 | 0.336 | 0.418 |
| (9) | (max − min)/ave | 0.174 | 0.446 | 0.091 | 0.150 | 0.264 |
| (10) | fL1/fL2 | 1.426 | 0.969 | 1.322 | 1.390 | 1.763 |

From the above-mentioned data, it can be understood that the imaging lenses of Examples 1 to 5 all satisfy Conditional Expressions (1) to (10), and are imaging lenses in which the total angle of view is as wide an angle as 90° or more, the F-Number is as small as 3.0 or less, and the absolute value of distortion is as small as 15% or less.

Figure 11:
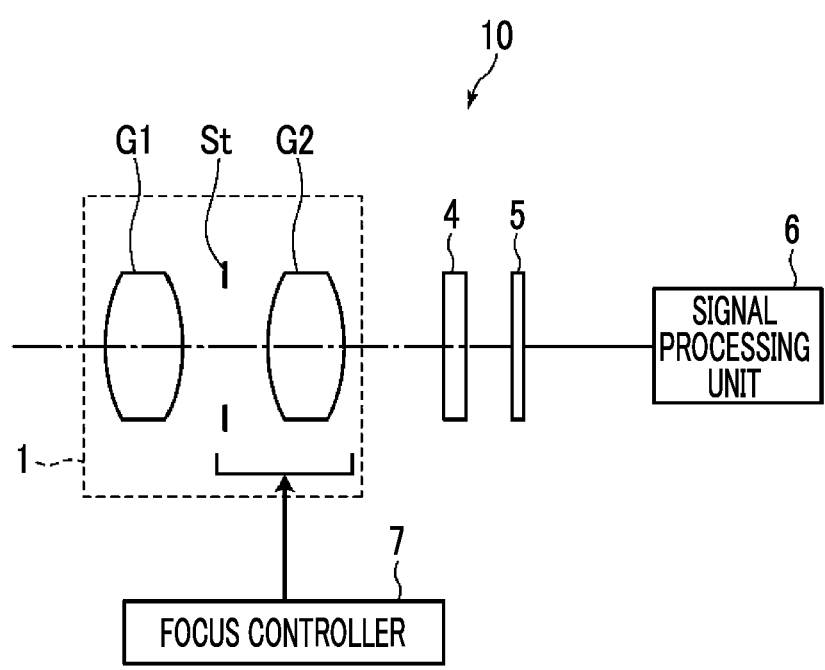
FIG. 11 is a schematic configuration diagram of an imaging apparatus according to an embodiment of the present invention.

Next, an imaging apparatus according to an embodiment of the present invention will be described. FIG. 11 shows a schematic configuration diagram of an imaging apparatus 10 using an imaging lens 1 according to an embodiment of the present invention, as an example of the imaging apparatus according to an embodiment of the present invention. Examples of the imaging apparatus 10 include an FA camera, an MV camera, a surveillance camera, an in-vehicle camera, or the like.

The imaging apparatus 10 includes the imaging lens 1, a filter 4 disposed on the image side of the imaging lens 1, an imaging device 5, a signal processing unit 6 that arithmetically processes an output signal from the imaging device 5, and a focus controller 7 for focusing the imaging lens 1. FIG. 11 conceptually shows a first lens group G1, an aperture stop St, and a second lens group G2 which are included in the imaging lens 1. Meanwhile, FIG. 11 shows an example in which the second lens group G2 and the aperture stop St are integrally moved by the focus controller 7 to perform focusing, but a method of focusing the imaging apparatus of the present invention is not limited to this example. The imaging device 5 captures an image of a subject formed by the imaging lens 1 to convert the captured image into an electrical signal, and, for example, a charge coupled device (CCD), a complementary metal oxide semiconductor (CMOS) or the like can be used as the imaging device. The imaging device 5 is disposed so that the imaging surface thereof is coincident with the image plane of the imaging lens 1. The imaging apparatus 10 of the present embodiment includes the imaging lens 1, and thus can acquire a satisfactory image with a wide angle.

Hereinbefore, the present invention has been described through embodiments and examples, but the present invention is not limited to the above-described embodiments and examples, and can be variously modified. For example, the curvature radius, the surface spacing, the refractive index, the Abbe number, the aspherical coefficient, and the like of each lens are not limited to the values shown in each of the numerical value examples, and other values can be used therefor.

For example, the above example illustrates the lens system in which focusing from an infinite object to a short-distance object is performed, but it goes without saying that the present invention can be applied to an imaging lens in which focusing from a finite long-distance object to a short-distance object is performed.

In addition, the imaging apparatus according to an embodiment of the present invention is also not limited to the above examples, and can replaced with various aspects such as a video camera, a digital camera, a film camera, or a cinema camera.

EXPLANATION OF REFERENCES

1: imaging lens
4: filter
5: imaging device
6: signal processing unit
7: focus controller
10: imaging apparatus
G1: first lens group
G2: second lens group
L11 to L15, L21 to L25: lens
PP: optical member
Sim: image plane
St: aperture stop
wa: on-axis light flux
wb: light flux of the maximum angle of view
Z: optical axis

What is claimed is:

1. An imaging lens comprising, in order from an object side;
    a first lens group;
    a stop; and
    a second lens group having a positive refractive power,
    wherein the first lens group consists of a 1-1st negative meniscus lens with its convex surface toward the object side, a 1-2nd negative lens with its concave surface toward an image side, a 1-3rd positive lens having a biconvex shape, a 1-4th negative meniscus lens with its convex surface toward the object side, and a 1-5th positive lens with its convex surface toward the object side, in order from the object side, and
    the following Conditional Expressions (1) and (2) are satisfied, $$-0.2 < f/f1 < 0.1 \tag{1}$$

$$0.1 < D8/f < 2.5 \tag{2}$$

where f is a focal length of the whole system in a state of being focused on an infinite object,
f1 is a focal length of the first lens group in a state of being focused on the infinite object, and D8 is a distance on an optical axis between the 1-4th negative meniscus lens and the 1-5th positive lens.

2. The imaging lens according to claim 1, wherein the following Conditional Expression (3) is satisfied, $$-1<(L4r-L5f)/(L4r+L5f)<-0.02 \quad (3)$$

where L4r is a paraxial curvature radius of a surface of the 1-4th negative meniscus lens on the image side, and
L5f is a paraxial curvature radius of a surface of the 1-5th positive lens on the object side.

3. The imaging lens according to claim 2, wherein the following Conditional Expression (3-1) is satisfied $$-0.8<(L4r-L5f)/(L4r+L5f)<-0.04 \quad (3-1).$$

4. The imaging lens according to claim 1, wherein the following Conditional Expression (4) is satisfied, $$0.1<(L4f-L4r)/(L4f+L4r)<0.95 \quad (4)$$

where L4f is a paraxial curvature radius of a surface of the 1-4th negative meniscus lens on the object side, and
L4r is a paraxial curvature radius of a surface of the 1-4th negative meniscus lens on the image side.

5. The imaging lens according to claim 4, wherein the following Conditional Expression (4-1) is satisfied $$0.15<(L4f-L4r)/(L4f+L4r)<0.93 \quad (4-1).$$

6. The imaging lens according to claim 1, wherein during focusing from an infinite object to a short-distance object, the first lens group is fixed to an image plane, and a portion of or the entirety of the second lens group moves to the object side.

7. The imaging lens according to claim 6, wherein during focusing, a lens of the second lens group closest to the object side moves at least.

8. The imaging lens according to claim 1, wherein the following Conditional Expression (5) is satisfied, $$0.02<D8/L<0.35 \quad (5)$$

where L is a length on an optical axis from a surface of the first lens group closest to the object side to a surface of the first lens group closest to the image side.

9. The imaging lens according to claim 8, wherein the following Conditional Expression (5-1) is satisfied $$0.03<D8/L<0.3 \quad (5-1).$$

10. The imaging lens according to claim 1, wherein the following Conditional Expression (6) is satisfied, $$3.5<L/f<8 \quad (6)$$

where L is a length on an optical axis from a surface of the first lens group closest to the object side to a surface of the first lens group closest to the image side.

11. The imaging lens according to claim 10, wherein the following Conditional Expression (6-1) is satisfied $$4.5<L/f<7 \quad (6-1).$$

12. The imaging lens according to claim 1, wherein the following Conditional Expression (7) is satisfied, $$0.2<f/f2<0.5 \quad (7)$$

where f2 is a focal length of the second lens group in a state of being focused on the infinite object.

13. The imaging lens according to claim 12, wherein the following Conditional Expression (7-1) is satisfied $$0.25<f/f2<0.45 \quad (7-1).$$

14. The imaging lens according to claim 1, wherein the following Conditional Expression (8) is satisfied, $$0.2<h1/h2<0.8 \quad (8)$$

where h1 is a height of a paraxial on-axis light ray on a surface of the first lens group closest to the object side, and
h2 is a height of a paraxial on-axis light ray of a surface of the first lens group closest to the image side.

15. The imaging lens according to claim 14, wherein the following Conditional Expression (8-1) is satisfied $$0.25<h1/h2<0.6 \quad (8-1).$$

16. The imaging lens according to claim 1, wherein the following Conditional Expression (9) is satisfied, $$0\leq(max-min)/ave<0.6 \quad (9)$$

where max is a maximum value of curvature radii of a surface of a negative lens of the first lens group on the image side,
min is a minimum value of curvature radii of a surface of a negative lens of the first lens group on the image side, and
ave is an average value of curvature radii of a surface of a negative lens of the first lens group on the image side.

17. The imaging lens according to claim 16, wherein the following Conditional Expression (9-1) is satisfied $$0.05<(max-min)/ave<0.55 \quad (9-1).$$

18. The imaging lens according to claim 1, wherein the following Conditional Expression (10) is satisfied, $$0.9<fL1/fL2<2 \quad (10)$$

wherein fL1 is a focal length of the 1-1st negative meniscus lens, and
fL2 is a focal length of the 1-2nd negative lens.

19. The imaging lens according to claim 1, wherein the following Conditional Expression (1-1) and/or (2-1) is satisfied $$-0.15<f/f1<0.05 \quad (1-1)$$

$$0.2<D8/f<2 \quad (2-1).$$

20. An imaging apparatus comprising the imaging lens according to claim 1.

* * * * *